United States Patent [19]
Brotz

[11] Patent Number: 5,104,060
[45] Date of Patent: Apr. 14, 1992

[54] HOT GAS DEVICE

[76] Inventor: Gregory R. Brotz, P.O. Box 1322, Sheboygan, Wis. 53081

[21] Appl. No.: 511,185
[22] Filed: Apr. 19, 1990
[51] Int. Cl.⁵ ............................................. B64B 1/40
[52] U.S. Cl. ........................................ 244/31; 244/5
[58] Field of Search .............. 244/29, 31, 30, 98, 244/33, 125, 126, 128, 5, 97, 96

[56] References Cited

U.S. PATENT DOCUMENTS

| 1,556,459 | 10/1925 | Szymanski | 244/97 |
| 1,600,451 | 9/1926 | Cartasso | 244/5 |
| 1,629,843 | 5/1927 | Silver | 244/97 |
| 1,834,614 | 12/1931 | Hall | 244/97 |
| 1,866,079 | 7/1932 | Blondin | 244/31 |
| 3,913,871 | 10/1975 | Miller | 244/5 |
| 3,993,268 | 11/1976 | Moore | 244/5 |

FOREIGN PATENT DOCUMENTS 337460  8/1930  Fed. Rep. of Germany ........ 244/96

Primary Examiner—Joseph F. Peters, Jr.
Assistant Examiner—Anne E. Bidwell
Attorney, Agent, or Firm—William Nitkin

[57] ABSTRACT

A closed-system hot gas device for flotation in the atmosphere having a rigid cap and flexible sides with an interior gas-heating element.

8 Claims, 3 Drawing Sheets

HOT GAS DEVICE

BACKGROUND OF THE INVENTION

1. Field of the Invention

The device of this invention resides in the area of hot air balloons and more particularly relates to a closed-system hot gas device with an integral gas-heating system.

2. Description of the Prior Art

Hot air balloons are well known in the prior art. Traditionally a hot air balloon has a single opening in its bottom and its flotation depends upon the temperature of the air within the balloon such air becoming lighter, as it is heated than that of the ambient atmosphere. Usually a flame is directed through the opening in the bottom of the balloon to heat the air within, forcing the air molecules further apart due to the heat energy and causing the entire hot air balloon structure to rise in the atmosphere. Closed-system, lighter-than-air devices, on the other hand, have no such openings at their bottoms but contain lighter-than-air gas such as hydrogen or helium. The lift of such closed-system lighter-than-air devices depends upon the gas atomic state in the natural ambient temperature. When the molecules of the gas are separated far enough apart to be lighter than the device's exterior ambient atmosphere, the device will float.

SUMMARY OF THE INVENTION

The device of this invention is a hot gas flotation device adapted to rise within the atmosphere and relies upon heated gas for lift rather than solely on unheated lighter-than-air gases. The device incorporates a closed gas-heating system whereby no external heat is entered into the device as is done in the prior art. The device of this invention contains the means to heat gas for lift within its structure and in combination with such heating system can further utilize lighter-than-air gases in foams as described below.

DESCRIPTION OF THE PREFERRED EMBODIMENT(S)

Figure 1:
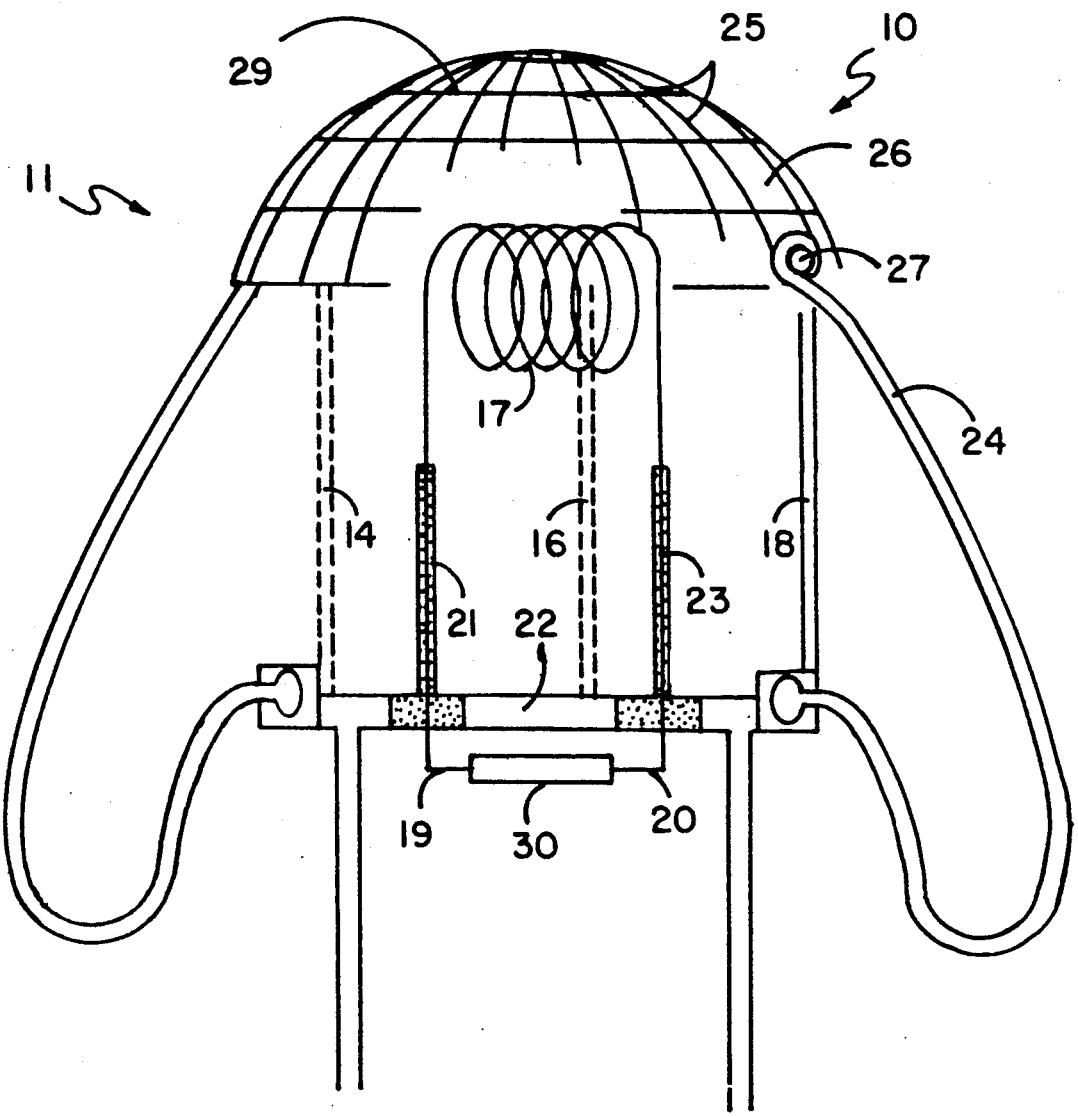
FIG. 1 illustrates a cross-sectional side view of a hot gas device incorporating the closed gas-heating system of this invention.

FIG. 1 illustrates the hot gas device 11 of this invention which, unlike prior art closed systems as found in hydrogen or helium-filled balloons or dirigibles, contains an enclosed gas-heating system. In the hot gas device of this invention a rigid cap ]U is seen supported upon support means made of three post members 14, 16 and 18 which are of sufficient strength to support cap 10 a distance away from rigid base 22 from which post members 14, 16 and 18 extend. Base 22 also supports rods 21 and 23 which extend upwards. Between the rods extend heating element 17 which heating element can be an electric coil heater. The electrical lines of heating element 17 pass through support rods 21 and 23, which can be hollow, downward out through the bottom of base 22, forming leads 19 and 20 through which electric current is directed from an electrical source, such as battery 30, to create heat within heating element 17. Rigid cap 10 can have an interconnected lightweight framework 29 covered with a thin film 26 that can withstand high temperature. Film 26 can in some embodiments have a gold metallized inner surface to reflect any infrared heat back within the structure so as to aid in heat conservation. Framework 29 of cap 10 can be in a geodesic or equivalent form with very lightweight framing members 25 made of aluminum or equivalent strong, lightweight material forming polygons covered with film 26 such as Mylar or Dupont Kapton film or higher temperature-resistant films such as thermoset polyimide and polyamide films which can withstand temperatures up to 500 degrees F. It is important that cap 10 be extremely light-weight and that the materials forming film 26 be resistant to the high temperatures building up within the structure. A thin encircling wall 24, which in some embodiments can be of an elastic, silicon-based rubber or equivalent material selected for heat resistance, is attached between cap 10 and base 22. The hot gas device of this invention will become lighter as heat production from heating element 17 expands the contents, usually a gas such as air, in the device. Wall 24, as mentioned above, can be of an elastic material or can, in other embodiments, be of a rigid inelastic film such as a thermosetting polyamid film. Polyphenylene sulfide films can also be used. Wall 24 is kept away from contact with heating element 17 by suspension from the edges 27 of cap 10 beyond the sides of heating element 17.

Figure 3:
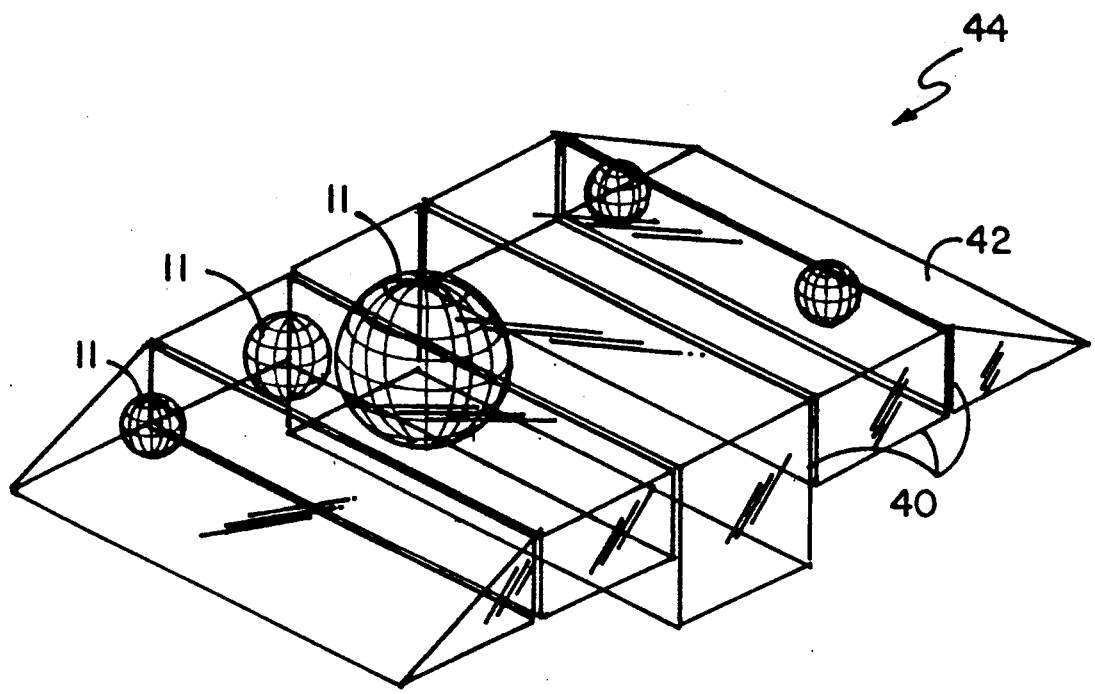
FIG. 3 illustrates a perspective view of a framework to contain a plurality of hot gas devices of this invention.
Figure 4:
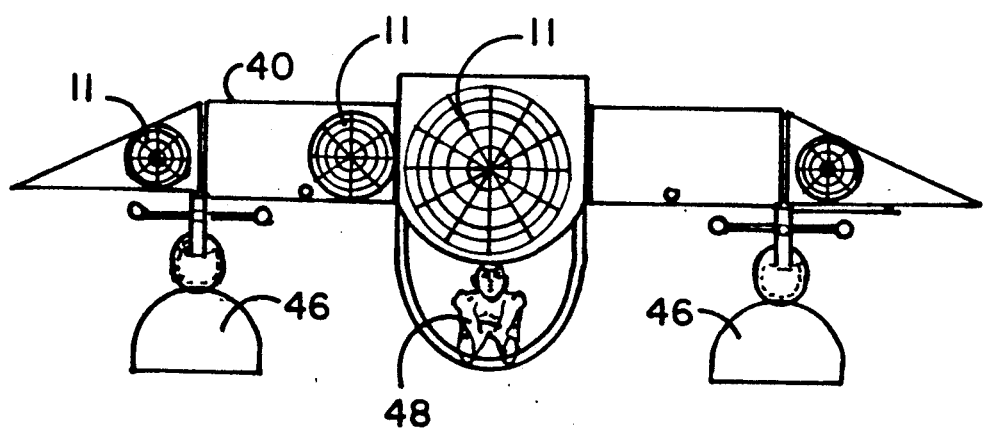
FIG. 4 illustrates a front view of the structure of FIG. 3.

There can be, in one embodiment, several of the devices of this invention supported within a common framework as seen in FIGS. 3 and 4 so that should any one of the hot gas devices fail, the others would maintain the structure airborne. FIG. 3 shows a perspective view of framework 40 of lightweight members that can be covered with a thin skin 42 and which contain a plurality of the hot gas devices of this invention with only some of such devices being shown. The covered framework 44 has aerodynamic qualities and can be fitted with means to steer the craft such as rudders and propulsion means such as motors 46 as seen in FIG. 4 which FIG. also shows an individual 48 riding in the craft.

A plurality of the hot gas devices of this invention could also be contained within an envelope or net of any number of materials. If multiple hot air devices of this invention are contained within a balloon structure, the interstices between the hot air devices and the balloon can be filled with nitrogen, helium or fire-resistant hydrogen-filled foam on which foam Applicant has a co-pending patent application. Because hydrogen has the highest heat capacity and specific heat value of all elements, it is preferred for use within an envelope containing multiple devices of this invention but, of course, has problems do to its flammability. By entrapping the gas such as hydrogen in a foam, its flammability is greatly reduced.

In creating suitable foams for use within the device of this invention, the use of a fluoropolymer such as asapolyfluoride or teflon polymer has significant advantages over the use of a water-based foaming material such as a soap and water. The hydrogen must be kept dry to maintain its light weight and a water-based foaming agent can give off water vapor into the cells of the foam while a foam of polyfluoride or teflon polymer has no water vapor but yet is the same weight as water and has a proper molecular weight and small degree of cross-linking to be made into a gelatinous foam mass of egg-white consistency containing a gas such as hydrogen in its cells. Such foam further can be maintained at high temperatures even when blown to a foam cell wall thickness. Such fluoropolymers when foamed have very high heat resistance and very high decomposition temperatures. Also, should the hot gas device develop a hole through which hot gas might escape, the rate of gas escaping is significantly slowed if such gas is trapped within a foam.

Figure 2:
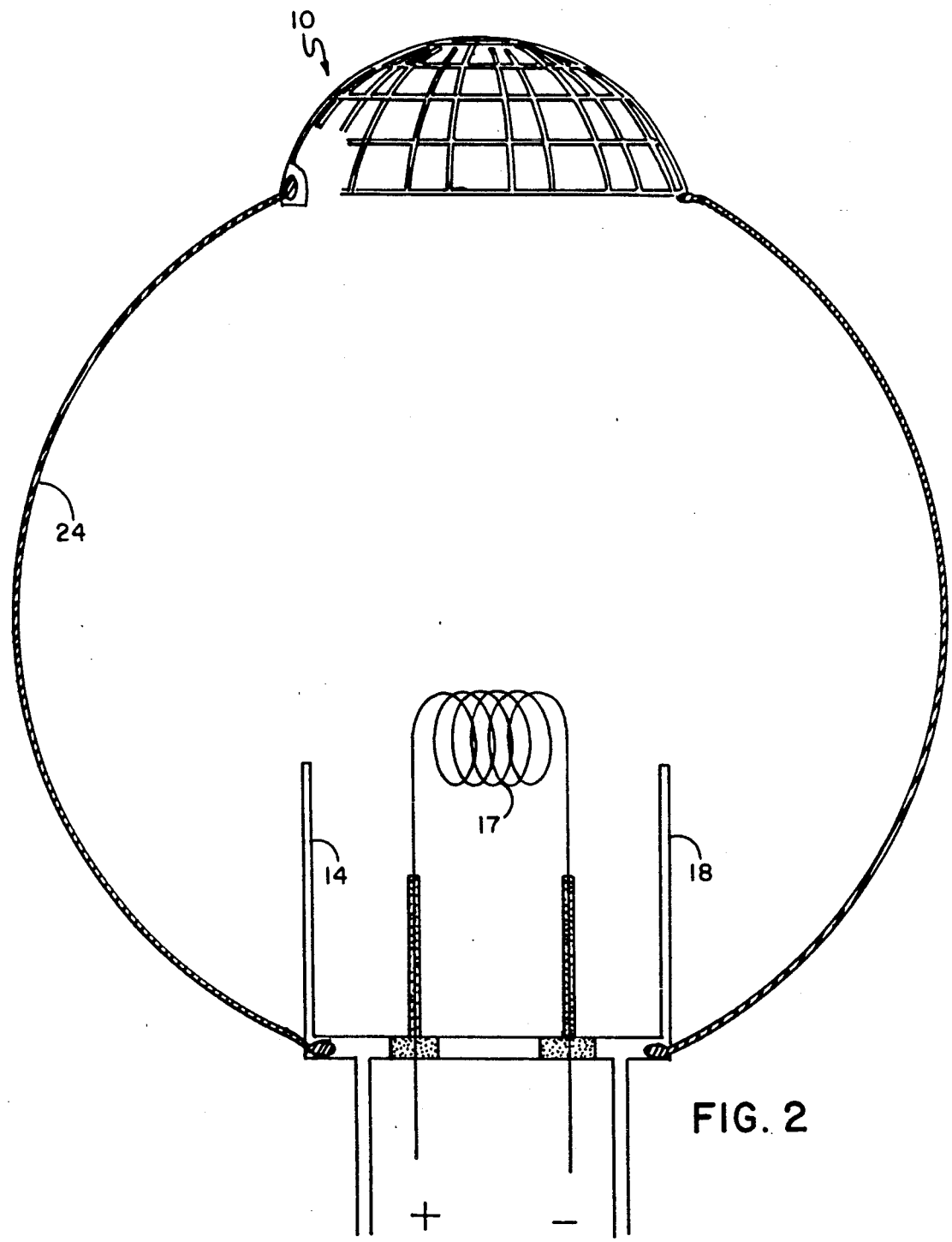
FIG. 2 illustrates a cross-sectional side view of the hot gas device of this invention showing the cap lifted and the sides of the wall expanded.

In using the device of this invention, electrical current is provided to heating element 17 which would heat the gas and such hot gas within the device of this invention would expand, swelling wall 24 outwards as seen in FIG. 2 and, in one embodiment, stretching the wall. Wall 24 is shown in FIG. 1 in its limp state. FIG. 2 shows the device of this invention with cap 10 lifted off supporting post members 14, 16, and 18 as the sides of wall 24 expand, allowing the structure to contain a very large volume of hot air within.

Although the present invention has been described with reference to particular embodiments, it will be apparent to those skilled in the art that variations and modifications can be substituted therefor without departing from the principles and spirit of the invention.

I claim:

1. A hot gas device, comprising:
   a rigid cap member;
   a base member positioned beneath said cap member;
   means to support said cap member a distance above said base member, said support means disposed on said base adapted to support said cap member when said device is in a non-expanded resting state;
   a flexible wall member interconnecting said cap member to said base member inn an gas-tight relationship, said wall member being ale to expand the distance between said cap member and said base member when said device is in an expanded state;
   a heating element
   means too support said heating element inn a non-contacting relationship with said cap member below said cap member when said cap member is resting on its support means;
   electrical contact means to receive electrical current directed to said heating element to cause said heating element to heat the area within said device; p1 contents contained within the confines of said cap, base and wall members;
   means to provide current to said electrical contacts whereby said heating element heats the contents of said hot gas device causing said contents to expand and causing the sides of said wall member to expand outward, and causing said cap member to lift off said support means while the flexible walls expand outward wherein said device eventually, due to the expansion of the said contents therein, becomes lighter than the ambient atmosphere and will float within the atmosphere;
   wherein said cap member support means comprises a plurality of post members;
   wherein said heating element support means comprises support rod members each supporting a portion of said heating element;
   wherein said cap member further includes:
   a light-weight frame structure having a plurality of interconnected frame members; and
   a heat-resistant film covering said frame structure between said frame members.

2. The device of claim 1 wherein said wall member is comprised of a stretchable material.

3. The device of claim 1 wherein said contents are air.

4. The device of claim 1 wherein said contents is a lighter-than-air gas.

5. The device of claim 4 wherein said contents include a heat-resistant foam containing a lighter-than-air gas.

6. A hot gas device, comprising:
   a rigid cap member;
   a base member positioned beneath said cap member;
   means to support said cap member, said means disposed on said base adapted to support said cap member when said device is in a resting state;
   a flexible wall member interconnecting said cap member to said base member in an gas-tight relationship, said wall member being able to expand the distance between said cap member rand said base member when said device is in ann expanded state;
   a heating element;
   means to support said heating element away from said cap member when said cap member is resting on its support means;
   electrical contact means to receive electrical current directed to said heating element to cause said heating element to heat the area within said device;
   contents contained within the confines of said cap, base and walls members;
   means to provide current to said electrical contacts whereby said heating element heats the contents of said hot gas device causing said contents to expand and causing the sides of said wall member to expand outward, and causing said cap member to lift off said support means while the flexible walls expand outward wherein said device eventually, due to the expansion of the said contents therein, becomes lighter than the ambient atmosphere and will float within the atmosphere;
   said cap member further including:
   a light-weight frame structure having a plurality of interconnected frame members; and
   a heat-resistant film covering said frame structure between said frame members.

7. The device of claim 6 wherein said wall member is comprised of a stretchable material.

8. A hot gas device, comprising:
   a rigid cap member;
   a base member positioned beneath said cap member;
   means to support said cap member, said means disposed on said base adapted to support said cap member when said device is in a resting state;
   a flexible wall member interconnecting said cap member to said base member in a gas-tight relationship, said wall member being able to expand the distance between said cap member and said base member when said device is in an expanded state;
   a heating element;
   means to support said heating element away from said cap member when said cap member is resting on its support means;
   electrical contact means to receive electrical current directed to said heating element to cause said heating element to heat the area within said device;

lighter-than-air gas contents contained within the confines of said cap, base and walls member, said contents further including a heat-resistant foam containing lighter-than-air gas; and means to provide current to said electrical contacts whereby said heating element heats the contents of said hot gas device causing said contents to expand and causing the sides of said wall member to expand outward, and causing said cap member to lift off said support means while the flexible walls expand outward wherein said device eventually, due to the expansion of the said contents therein, becomes lighter than the ambient atmosphere and will float within the atmosphere.

* * * * *